Patented Oct. 12, 1954

2,691,663

UNITED STATES PATENT OFFICE 2,691,663

ESTERS OF SUBSTITUTED PENTANEDIOLS

Curtis W. Smith, Berkeley, Calif., assignor to Shell Development Company, Emeryville, Calif., a corporation of Delaware No Drawing. Application October 29, 1951,
Serial No. 253,763

13 Claims. (Cl. 260—410.6)

This invention relates to a new class of chemical compounds. More particularly, the invention relates to novel esters of substituted pentanediols, and to their utilization, particularly as plasticizers for vinyl polymers.

Specifically, the invention provides new and valuable esters of (1) substituted 1,5-pentanediols wherein a chain carbon atom immediately adjacent to one of the terminal hydroxyl-bearing carbon atoms is a tertiary carbon atom and the chain carbon atom adjacent to the other hydroxyl-bearing carbon atom is a quaternary carbon atom, one of the carbon atoms to which the said quaternary carbon atom is attached being the carbon atom of an ether substituted alkyl group, such as, for example, 2,4-dimethyl-2-methoxymethyl-1,5-pentanediol, and (2) carboxylic acids and/or carboxylic acid esters, and preferably those acids and acid esters containing at least six carbon atoms. The invention further provides thermoplastic vinyl polymer compositions plasticized with the above-described novel esters.

As a preferred embodiment, the invention provides a special group of polymerizable unsaturated esters of the above-described substituted 1,5-pentanediols and unsaturated acids and/or unsaturated acid esters, and particularly the acid esters of polycarboxylic acids, such as maleic acid, and ethylenically unsaturated monohydric alcohols. The invention further provides as a special feature, vinyl polymer compositions, and particularly plastisol and organosol type compositions, containing the aforedescribed unsaturated esters, and hard, flexible products obtained by subjecting the compositions to polymerizing conditions.

This application is a continuation-in-part of my application, Serial No. 124,736, filted October 31, 1949, which has issued as U. S. Patent No. 2,600,275.

Vinyl polymers, and especially the vinyl halide polymers, are generally quite brittle and are difficult to mill and mold. To overcome these difficulties, it is common practice to mix the polymers with a plasticizing material, such as di(2-ethylhexyl) phthalate, dibutyl sebacate and tricresyl phosphate. Compositions containing these plasticizing materials can be readily worked on roll mills and easily molded or extruded to form flexible sheets or solid articles. Finely divided vinyl polymers may also be mixed with large quantities of liquid plasticizers to form plastisol or organosol compositions that can be spread as a paste on cloth or metal panels and cured to form flexible coatings or films.

It has been found, however, that the compounds suggested heretofore as plasticizers for the vinyl resins are not entirely satisfactory for many applications. Many of the suggested plasticizers, for example, are readily lost from the composition through migration and/or volatilization and the composition again becomes brittle and easily cracked. This is particularly true of the conventional monomeric ester-type plasticizers.

It has also been found that the addition of the suggested plasticizers has a deleterious effect on many of the other important properties of the finished composition. The addition of the plasticizers in amounts sufficient to bring about the desired flexibility, for example, generally decreases the tensile strength of the product and makes them soft and supple. Such products are unable to be used for many applications, such as in the preparation of floor tile and coatings for seat covers, etc., where the finished product must also be hard and tough as well as being flexible. The addition of the plasticizers also in many cases seriously effects the odor and color as well as the water and alkali resistance of the finished composition. These deflects make the compositions unsuited for use in the preparation of many household and clothing articles, such as table covers, boots, etc.

Various unsuccessful attempts have been made in the past to correct these difficulties. It was felt that the use of high molecular weight materials as plasticizers would prevent the subsequent loss through migration and/or volatilization, but it has been found that many of these materials are still subject to migration and evaporation, and in addition, they are generally incompatible at the desired loadings with the vinyl polymers, fail to impart the desired processability and flexibility, and still seriously effect the odor, color and water resistance of the resulting composition. Furthermore, their addition generally makes the compositions too thick for use as plastosol pastes.

Attempts have been made to use the conventional plasticizers to gain flexibility and then add other agents to improve the loss of other properties brought about by the use of such plasticizers. Attempts have been made, for example, to improve the strength and hardness by adding hardening agents with the plasticizers, but the results obtained heretofore have shown little promise. In many cases, the product formed after the curing of the hardening agent is a heterogeneous combination of two incompatible materials and it has very poor strength. Other of the suggested additives cannot be hardened during the short processing steps employed with the vinyl polymers and if the curing period is extended it has a deleterious effect on the polymer. The suggested hardening agents are also generally unsuited for use in the preparation of plastisols as they make the composition too thick for use as a spreadable paste.

It is therefore an object of the invention to provide a new class of plasticizers for the vinyl polymers. It is a further object to provide novel plasticizers for the vinyl polymers that are relatively non-volatile and non-migratory. It is a further object to provide novel plasticizers for vinyl polymers that endow the resulting plasticized compositions with increased strength and toughness. It is a further object to provide plasticizers that endow the vinyl polymers with excellent flexibility, even at the lower temperatures. It is a further object to provide novel plasticizers that may be readily polymerized in combination with the vinyl polymers to produce products which are very hard and tough but still highly flexible. It is a further object to provide novel liquid plasticizers which are ideally suited for use in preparing vinyl polymer plasticizers and organosol compositions. It is a further object to provide novel liquid esters of substituted 1,5-pentanediols having unexpected superior properties. It is still a further object to provide improved vinyl polymer compositions, and particularly vinyl polymer plastisol and organosol compositions. Other objects and advantages of the invention will be apparent from the following detailed description thereof.

It has now been discovered that these and other objects may be accomplished by the novel esters of the invention comprising the esters of (1) substituted 1,5-pentanediols wherein the chain carbon atoms immediately adjacent to one of the terminal hydroxyl-bearing carbon atoms is a tertiary carbon atom and the chain carbon atom adjacent to the other hydroxyl-bearing carbon atom is a quaternary carbon atom, one of the carbon atoms to which the said quaternary carbon atom is attached being the carbon atom of an ether substituted alkyl group, and (2) carboxylic acids and/or carboxylic acid esters, preferably those acids and acid esters containing at least six carbon atoms. These particular esters have been unexpectedly found to be superior plasticizers for the vinyl polymers, and particularly the vinyl halide polymers, as they are highly compatible therewith and when used, even in relatively small quantities, endow the said polymer compositions with many improved properties. Vinyl polymer compositions containing these esters have excellent flexibility, even at the lower temperatures, and improved strength and toughness. In addition, the compositions have been found to have excellent stability and can withstand long periods of use and exposure to air and high temperatures without loss of plasticizer through migration and/or volatilization.

Coming under special consideration as plasticizers are the esters of the above-described substituted 1,5-pentanediols and unsaturated acids and/or unsaturated acid esters, and preferably the acid esters of polycarboxylic acids, such as maleic acid, and ethylenically unsaturated monohydric alcohols, such as those of the allyl and vinyl-type. It has been unexpectedly found that these particular esters, in addition to bestowing the above-described superior properties, may be cured in combination with the vinyl polymers at a very rapid rate during the usual processing steps to produce homogeneous compositions which are extremely hard but still quite flexible. These preferred esters have been found to be particularly suited for use in preparing vinyl polymer plastisol and organosol compositions. When combined with the finely-divided polymers, they form liquid mixtures that can be easily spread on cloth or metal panels and cured to produce very hard but flexible films. They are particularly suited for this and other applications as they are relatively non-volatile and the resulting plasticized compositions can be cured in an open system without fear of loss of plasticizer.

The substituted 1,5-pentanediols used in producing the novel esters of the invention comprise those diols having a straight chain of five carbon atoms the terminal carbon atoms of which are joined to hydroxyl groups, a chain carbon atom adjacent to one of these terminal hydroxyl-bearing carbon atoms being a tertiary carbon atom, and the chain carbon atom adjacent to the other terminal hydroxyl-bearing carbon atom being a quaternary carbon atom which is joined to a carbon atom of an ether-substituted alkyl group. Examples of these diols are 2,4-dimethyl-2-methoxymethyl-1,5-pentanediol, 2,4 - di(methoxybutyl) -2-butoxymethyl-1,5-pentanediol, 2,4 - diethyl - 2 hydroxyethoxymethyl - 1,5 - pentanediol, 2,4 - di(chlorobutyl) - 2 - methoxymethyl - 1,5-pentanediol, 2,4 - dihexyl-2-butoxymethyl - 1,5-pentanediol, 2,4 - dibutyl - 2 - ethoxyhexyloxymethyl - 1,5 - pentanediol, 2 - butyl - 4 - hexyl-2 - propoxy - methyl - 1,5 - pentanediol, 2,4 - (dicyanobutyl) - 2 - isobutoxymethyl - 1,5 - pentanediol, 2,4 - dicyclohexyl - 2 - allyloxymethyl - 1,5-pentanediol, 2,4-didecyl-2-cyclohexoxymethyl-1,5 - pentanediol, 2,4 - diphenyl - 2 - methallyloxymethyl - 1,5 - pentanediol, 2,4-diisopropyl-2-chloroethoxybutyl-1,5-pentanediol, 2,4-diphenyl-2-dodecyloxymethyl-1,5-pentanediol, 2,4-diethyl-2-diethoxybutoxymethyl-1,5-pentanediol, 2,4-di-(chlorocyclohexyl) - 2 - methallyloxybutyl-1,5-pentanediol, 2,4-dibenzyl-2-phenoxymethyl-1,5-pentanediol, and 2,4-dibromobutyl-2-cinnamyloxymethyl-1,5-pentanediol.

The preferred diols are the substituted 1,5-pentanediols wherein the tertiary carbon atom joined to one of the terminal carbinol groups is joined to a carbon atom of a hydrocarbon radical or a substituted hydrocarbon radical as a halo- or cyano-substituted radical wherein the said radicals contain from 1 to 18 carbon atoms, and the quaternary carbon atom joined to the other terminal carbinol group is joined to a carbon atom of the same or different hydrocarbon or substituted hydrocarbon radical described above, and to an ether-substituted methyl group wherein the substituent attached to the methyl group is a member of the group consisting of —OR radicals, —OXOR radicals and

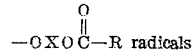

wherein R is a hydrocarbon radical, preferably containing from 1 to 18 carbon atoms and X is a polyvalent hydrocarbon radical containing from 1 to 7 carbon atoms. Examples of these preferred diols are 2,4-dioctyl-2-methoxy-butoxymethyl-1,5-pentanediol, 2,4-didecyl-2-ethoxymethyl-1,5-pentenediol, 2,4-diamyl-2-benzyloxymethyl-1,5-pentanediol, 2,4-diamyl-2-butoxyhexoxymethyl-1,5-pentanediol, 2,4 - dioctyl - 2 - cyclohexyloxymethyl-1,5-pentanediol, 2,4 - dicyclopentyl - 2 - ethoxymethyl-1,5-pentanediol, 2,4-diheptyl-2-trimethylheptyloxymethyl-1,5-pentanediol, 2,4-diethyl-2-valeroxybutoxymethyl - 1,5 - pentanediol, 2,4 - dioctyl - 2 - (3',7' - diacetoxyheptoxymethyl)-1,5-pentanediol, 2,4 - dibenzyl - 2 -dodecyloxymethyl - 1,5 - pentanediol, 2,4 - didecyl - 2 - ethoxymethyl - 1,5 - pentanediol, 2,4 - diamyl-2-aceboxybutoxymethyl-1,5-pentanediol, and 2,4-diamyl - 2 - hexyloxymethyl - 1,5 - pentanediol.

Particularly preferred diols are those of the general formula:

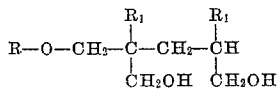

wherein R is a hydrocarbon radical which is free of any type of aliphatic unsaturation, e. g. an alkyl, cycloalkyl or aryl radical, and preferably contains from 1 to 10 carbon atoms, and both $R_1$'s are identical alkyl radicals, preferably containing from 1 to 8 carbon atoms. Examples of these diols are 2,4-dimethyl-2-methoxymethyl-1,5-pentanediol, 2,4-dibutyl-2-propoxymethyl-1,5-pentanediol, 2,4 - dimethyl - 2 - isobutoxymethyl-1,5-pentanediol, 2,4-diamyl-2-benzyloxymethyl-1,5-pentanediol, 2,4 - diethyl - 2 - hexyloxymethyl-1,5 - pentanediol, 2,4-dibutyl-2-butoxymethyl-1,5-pentanediol, 2,4-dimethyl-2-nonyloxymethyl-1,5-pentanediol, 2,4-dihexyl-2-decyloxymethyl-1,5-pentanediol, 2,4-dioctyl-2-benzyloxymethyl-1,5-pentanediol, and 2,4-diheptyl-2-cyclohexylmethoxymethyl-1,5-pentanediol.

The diols of the above-described formula wherein R is an ether-substituted hydrocarbon radical —XOR wherein R is a hydrocarbon radical, and preferably an aliphatic radical, containing from 1 to 10 carbon atoms and X is a bivalent aliphatic hydrocarbon radical, containing from 1 to 6 carbon atoms, come under special consideration, particularly because of the improved plasticizing properties of their esters.

The above-described substituted 1,5-pentanediols may be prepared by any suitable method. They may be prepared, for example, by reacting a 2,4 - dihydrocarbyl-2-alkoxymethyl-1,5-dihalopentane with water, silver hydroxide or a strong base, or by hydrolyzing a substituted dihydropyran and hydrogenating the resulting product. The diols may also be prepared by hydrogenating the corresponding substituted 1,5-pentanedials, or the lactones prepared from these 1,5-pentanedials.

The acids used in preparing the novel esters may be monocarboxylic or polycarboxylic, saturated or unsaturated, and may be aliphatic, alicyclic, heterocyclic or aromatic. They may also be substituted if desired with non-interfering substituents, such as halogen atoms, alkoxy radicals, and the like. Illustrative examples of these acids are acetic acid, butyric acid, hexanoic acid, enanthic acid, caprylic acid, pelargonic acid, capric acid, hendecanoic acid, lauric acid, myristic acid, palmitic acid, stearic acid, arachidi acid, angeli acid, sorbi acid, hydrosorbic acid, 2-octenedioic acid, acrylic acid, methacrylic acid, crotonic acid, alphachloroacrylic acid, 2,8-decadienoic acid, 2,5-heptadienoic acid, cyclohexanoic acid, cyclopentenoic acid, butylcyclohexanoic acid, tartaric acid, benzoic acid, naphthoic acid, toluic acid, methylbenzoic acid, nonylbenzoic acid, nicotinic acid, succinic acid, glutaric acid, diglycolic acid, pimelic acid, ketopimelic aid, suberic acid, azelaic acid, brassylic acid, maleic acid, fumaric acid, glutaconic acid, hydromuconic acid, 3-hexene-1,2,3,4-tetracarboxylic acid, phthalic acid, isophthalic acid, terephthalic acid, tetrachlorophthalic acid, trimesic acid, pyromellitic acid, 1,4-cyclohexanedicarboxylic acid, cyclohexaneacetic acid, chlorocyclohexanoic acid, dibromotoluic acid, and citric acid. Preferred acids of this group comprise the monocarboxylic acids containing from 1 to 18 carbon atoms and the dicarboxylic acids containing from 2 to 16 carbon atoms.

Particularly preferred acids to be used in preparing the novel esters comprise the monocarboxylic acids containing at least 6 carbon atoms and preferably the aliphatic acids containing from 6 to 15 carbon atoms and the aromatic monocarboxylic acids containing from 7 to 14 carbon atoms and having the carboxyl group attached directly to the aromatic ring, such as caprylic, caproic, 2-ethylhexanoic, 3,5,5-trimethylhexanoic, pelargonic, capric, lauric, myristic, palmitic, benzoic, toluic, methylbenzoic, isopropylbenzoic, tert-butylbenzoic ,and the like. Special members of this group comprise the alkanoic acids containing from 6 to 12 carbon atoms and the aryl monocarboxylic acids containing from 7 to 10 carbon atoms.

Coming under special consideration, particularly because of the use of their esters as polymerizable plasticizers for the vinyl polymers, are the unsaturated aliphatic monocarboxylic acids containing from 3 to 15 carbon atoms, such as acrylic acid, methacrylic acid, hexadienoic acid, and the like. Special members include the alkenoic acids containing from 3 to 10 carbon atoms.

Acid esters may also be used to prepare the novel esters of the invention. The acid esters employed for this purpose are those obtained by esterifying at least one and at most all but one of the carboxyl groups of a polycarboxylic acid with a monohydric alcohol. The polycarboxylic acids used for this purpose may be any of those described above for the direct esterification of the substituted 1,5-pentanediols. The monohydric alcohols may be aliphatic, aromatic or heterocyclic, saturated or unsaturated, such as methanol, ethanol, butanol, cyclohexanol, allyl alcohol, methallyl alcohol, benzyl alcohol, cyclopentenol, furfuryl alcohol, tetrahydropyran-2-methanol, dihydrofuran-2-ethanol, 2 - methylcyclohexanol, and the like. Preferred alcohols of this group comprise the aliphatic monohydric alcohols containing from 1 to 12 carbon atoms and the heterocyclic alcohols containing from 4 to 15 carbon atoms and having at least one oxygen, sulfur or nitrogen atom in the cyclic structure. Particularly preferred monohydric alcohols are the unsaturated alcohols of the allyl and vinyltypes, i. e., the alpha, beta-ethylenically unsaturated alcohols and the beta, gamma-ethylenically unsaturated alcohols, such as vinyl alcohol, 1-propen-ol, 1-hexen-1-ol, 3-chloro-1-buten-1-ol, allyl alcohol, crotyl alcohol, cinnamyl alcohol, 2,4-hexadien-1-ol, 3-chloro-2-buten-1-ol, and the like. Especially preferred are the 2-alkenols containing from 3 to 12 carbon atoms and the 1-alkenols containing from 2 to 8 carbon atoms.

Special acid esters to be used in preparing the novel esters are the esters of the polycarbocyclic acids containing from 2 to 16 carbon atoms and the aliphatic monohydric alcohols containing from 1 to 12 carbon atoms. Particularly preferred because of the value of the resulting esters as polymerizable plasticizers for the plastisol and organosol compositions are the acid esters of the unsaturated dicarboxylic acids containing from 4 to 12 carbon atoms and the above-described allyl and vinyl-type alcohols.

The novel esters of the invention are obtained by esterifying the above-described substituted 1,5-pentanediols with one or more of the above-described carboxylic acids and/or acid esters. Illustrative examples of the novel esters include 2,4 - dimethyl-2-methoxymethyl-1,5-pentanediol dicaprylate, 2,4 - dihexyl - 2 - butoxymethyl - 1,5-pentanediol dipelargonate, 2,4 - diisopropyl-2-chloroethoxybutyl-1,5-pentanediol dilaurate, 2,4-diphenyl - 2 - dodecyloxymethyl-1,5-pentanediol dibenzoate, 2,4 - dibenzyl - 2 - pentoxymethyl-1,5-pentanediol distearate, 2,4-dibromobutyl-2-cinnamyloxymethyl-1,5-pentanediol diacrylate, 2,4-dimethyl - 2 - methoxymethyl - 1,5 - pentanediol acrylate laurate, 2,4-dichlorobutyl-2-isobutyoxymethyl-1,5-pentanediol bis(allyl maleate), 2,4-dimethyl-2-methoxymethyl-1,5-pentanediol bis-(vinyl succinate), the polyester of 2,4-dibutyl-2-allyloxymethyl - 1,5 - pentanediol succinate, the polyester of 2,4-dichlorocyclohexyl-2-methoxymethyl-1,5-pentanediol and phthalic acid, and the polyester of 2,4-dimethyl-2-dodecyloxymethyl-1-5-pentanediol and 1,2,4-butanetricarboxylic acid.

Preferred esters are those obtained by reacting the substituted pentanediols with the above-described preferred monocarboxylic acids containing at least 6 carbon atoms and the above-described preferred acid esters of the polycarboxylic acids and the aliphatic monohydric alcohols containing from 1 to 12 carbon atoms, such as 2,4-dimethyl - 2 - methoxymethyl - 1,5 - pentanediol dicaprylate, 2,4 - dibutyl - 2 - methoxymethyl - 1,5-pentanediol allyl maleate vinyl succinate, 2,4-dihexyl-2-ethoxymethyl - 1,5 - pentanediol bis(allyl adipate), and 2,4-dimethyl-2-ethoxymethyl-1,5-pentanediol dibenzoate.

Of particular interest are the esters of the preferred substituted pentanediols and the above-described unsaturated monocarboxylic acids and the acid esters of the unsaturated dicarboxylic acids and the allyl and vinyl-type alcohols.

The above-described esters may be prepared by any suitable method. They are preferably prepared by direct esterification wherein the substituted 1,5-pentanediols are reacted with the desired carboxylic acid or the carboxylic acid ester. According to this method, the acids (or their anhydrides) and/or the acid esters are combined with the substituted 1,5-pentanediols and the resulting mixture heated together, the water formed during the reaction being removed, preferably by distillation. Esterification catalysts may be used if desired to speed up the reaction. Such catalysts may be exemplified by p-toluenesulfonic acid, ethanesulfonic acid, chloroacetic acid, sulfuric acid, zinc chloride, and the like. The amount of the catalyst employed may vary over a wide range but will generally be between 0.1% to 5% by weight of the reactants. Preferred amounts of catalyst vary between 0.5% and 2% by weight.

The amount of the acid component and substituted 1,5-pentanediol to be used in the reaction will vary depending upon the product and the process selected. In general, the acid component is reacted with at least a chemical equivalent amount of the diol. As used throughout the specification and claims, the expression "chemical equivalent amount" refers to that quantity required to furnish approximately one carboxyl group for every hydroxyl group of the alcohol molecule. Preferably, the alcohol and acid are reacted in chemical equivalent ratios varying from 1:1 to 1:5, respectively.

The esterification may be accomplished in the presence or absence of solvents or diluents. In case solvents or diluents are desired, organic compounds, such as benzene, toluene, cyclohexane, xylene, and mixtures thereof, which do not interfere with the reaction, may be utilized.

The temperature employed in the esterification process may vary over a considerable range. In general, temperatures varying between about 70° C. and 150° C. are preferred. Particularly preferred temperatures range from 80° C. to 100° C. Higher or lower temperatures may be utilized, however, if desired or necessary. Atmospheric, superatmospheric, or subatmospheric pressures may be employed.

The separation of the esters formed in the reaction may be accomplished by any suitable means, such as extraction, distillation, fractional precipitation, and the like.

The polymers to be plasticized with the above-described esters may be any of the thermoplastic polymers of the vinyl-type monomers containing a $CH_2=C=$ group. The term "polymer" is employed throughout the specification and claims in a generic sense to refer to the homopolymers, copolymers and interpolymers of these particular monomers. Examples of the vinyl-type monomers are the monovinyl substituted aromatic compounds as styrene, alpha-methylstyrene, dichlorostyrene and vinyl naphthalene; the alkyl esters of the mono- and polycarboxylic unsaturated acids as methyl acrylate, methyl methacrylate, butyl methacrylate and propyl acrylate, dimethyl maleate, dibutyl fumarate and dihexyl maleate; the alkenyl esters of the saturated monocarboxylic acids as allyl acetate, methallyl butyrate, vinyl benzoate, vinyl valerate and vinyl caproate; the vinylidene halides as vinylidene chloride and vinylidene fluoride; the vinyl halides as vinyl chloride and vinyl bromide; the unsaturated nitriles as acrylonitrile and methacrylonitrile; the unsaturated ethers as vinyl ethyl ether, vinyl butyl ether, and allyl octyl ether; and the unsaturated ketones, such as vinyl butyl ketone, vinyl ethyl ketone, and the like.

A preferred group of vinyl-type polymers to be plasticized are the vinyl halide polymers. The expression "vinyl halide polymer" as used throughout the specification and claims refer to those polymers containing a predominant quantity, i. e., at least 60%, of the monomeric units as vinyl halide units as vinyl chloride, vinyl bromide, vinyl iodide or vinyl fluoride. Particularly preferred vinyl polymers are the vinyl chloride polymers having 90% to 100% vinyl chloride units.

The vinyl-type polymers employed may have a variety of molecular weights. The preferred polymers, and this is particularly true when they are to be used in the preparation of plastisols and organosols, are those having a molecular weight as measured by the Staudinger method described in Ind. Eng. Chem., vol. 36, p. 1152 (1936), of at least 15,000, and preferably above 20,000. Commercial grades of vinyl chloride polymers having molecular weights between 100,000 and 200,000 are particularly suited for use with the above-described polymerizable plasticizers.

If the polymers are to be used in the preparation of plastisol and organosol compositions they should preferably be in a finely-divided state of subdivision. Generally, they should have a size of less than five microns and more particularly a size between 0.1 and 1 micron.

The plasticizers of the present invention may be added to the vinyl-type polymers singly, in admixture or in combination with other plasticizing materials. The addition of other types of plasticizing agents along with the plasticizers of the present invention is desirable in many cases and particularly in those instances where the composition is to be a plastisol or organosol. Examples of these secondary agents include the phosphoric acid esters of phenols or aliphatic alcohols such as tricresyl phosphate, the alkyl and alkoxyalkyl esters of dicarboxylic acids and particularly the alkyl and alkoxyalkyl esters of the aromatic acids, such as dibutyl phthalate, diamyl phthalate and dioctyl phthalate.

The amount of the plasticizer to be added to the vinyl polymer will vary over a wide range depending on the type of product desired. If the vinyl polymers are to be used to produce calendered sheets or rigid molded articles, the amount of the plasticizer generally will vary from 30 parts to 150 parts per 100 parts of polymer. Preferred amounts vary from 40 to 80 parts per 100 parts of polymer. If other types of plasticizing agents are employed, these proportions may be reduced considerably. Generally the amount of the novel plasticizers will vary from 20 to 70 parts and the secondary plasticizer from 50 to 20 parts.

If the vinyl polymers are to be used in preparing plastisols, the amount of the plasticizer employed will depend upon that required to form a fluid spreadable paste with the polymer at normal temperatures (e. g. about 20° C.). The resulting composition preferably should have a viscosity not greater than 1000 poises at 20° C. and preferably between 50 and 400. Generally the desired results are obtained by employing from 40 parts to 120 parts of the novel liquid plasticizer. All but about 20 parts of this could be replaced by other plasticizers.

In the case of organosols, the liquid vehicle will contain added solvents, such as xylene, and increased amounts of plasticizer may be tolerated. Preferred amounts of plasticizer in these cases vary from 60 parts to 110 parts per 100 parts of polymer. The amount of solvent employed generally varies between 1 to 20 parts and in some cases as high as 30 parts per 100 parts of polymer.

If the novel esters are unsaturated, catalysts may be added to the composition to accelerate the polymerization of the said esters in combination with the vinyl polymers. Preferred catalysts are the peroxide catalysts, such as benzoyl peroxide, tertiary butyl perbenzoate, ditertiary butyl diperphthalate, tertiary butyl peracetate, and the like, and mixtures thereof. Particularly preferred catalysts are the di-tert-alkyl peroxides. The amount of the catalyst added will generally vary from 0.01% to 5%, and more preferably from 1% to 2% by weight of the polymer.

Various pigments, colors, fillers and resin stabilizers may be added to the compositions. Many of the resins, such as the vinyl halide polymers, may undergo a slight discoloration when subjected to the high temperatures employed in the curing process so it is advisable to add materials known to stabilize the polymers against discoloration by heat.

The polymers and plasticizer may be compounded together by means of any of the conventional equipment, such as mills of the heated roll type or internal mixers. The plasticizer and other compounding ingredients are worked into the polymer so that they are thoroughly dispersed therein, and the resulting composition then molded, calendered, extruded or otherwise formed into the desired articles.

In the case of the polymerizable plasticizers, the temperatures employed during the milling and molding and subsequent treatment should be sufficient to bring about the desired degree of polymerization of the esters. In the presence of the aforedescribed active catalysts, the polymerization may be accomplished at a relatively rapid rate at temperatures between 100° C. and 200° C. and preferably between 125° C. and 200° C. The esters may be completely polymerized in the presence of the vinyl polymers or the polymerization may be carried only to partial completion in order to produce products having various degrees of hardness.

To illustrate the manner in which the invention may be carried out the following examples are given. It is to be understood that the examples are for the purpose of illustration and the invention is not to be regarded as limited to any of the specific compounds or conditions recited therein. Unless otherwise specified, parts disclosed in the following examples are parts by weight.

*Example I*

About 88 parts of 2,4-dimethyl-2-methoxymethyl-1,5-pentanediol was mixed with 125 parts of benzene, 283 parts of capric acid, and 1.25 parts of p-toluenesulfonic acid and the resulting mixture heated under reflux for several hours while the theoretical amount of water was collected as an azeotrope. Distillation of the resulting mixture yielded 134 parts of 2,4-dimethyl-2-methoxymethyl-1,5 - pentanediol dicaprate, a viscous liquid having the following properties: B. P. 195–197° C. (0.04 mm.); $n\ 20/d$ 1.4520; sp. gr. 20/4 0.9286. Analysis: C, per cent found, 71.65, calc., 71.85; H, per cent found, 11.54, calc., 11.64; ester value, 0.413 eq./100 g., calc., 0.453 eq./100 g.; hydroxyl value, 0.003 eq./100 g.

About 100 parts of poly(vinyl-chloride) was compounded with 60 parts of 2,4-dimethyl-2-methoxymethyl-1,5-pentanediol dicaprate produced above by mixing the two ingredients together with 2 parts (per 100 parts of polymer) of a trade stabilizer, milling the mixture together on a roll mill at a temperature between 130° C. and 150° C. and then molding the resulting sheet at 160° C. for two minutes. Some of the properties of the resulting sheet are shown in the following table in comparison to a similar sheet plasticized with 60 parts of bis(2-ethylhexyl)-phthalate.

| Test | 2,4-dimethyl-2-methoxymethyl-1,5-pentanediol dicaprate | bis(2-ethylhexyl) phthalate |
| --- | --- | --- |
| Volatility | 0.3 | 1 |
| Brittle Point, °C | −60 | −26 |
| Hardness, Durometer A | 85 | 63 |
| Tensile Strength, p. s. i | 2,130 | 2,270 |
| Modulus at 100% p. s. i | 1,220 | 860 |

*Example II*

About 95 parts of 2,4-dimethyl-2-ethoxymethyl-1,5-pentanediol is mixed with 125 parts of benzene, 184 of benzoic acid, and 1.25 parts of p-toluenesulfonic acid and the resulting mixture heated under reflux for several hours while the theoretical amount of water is collected. Distillation of the mixture yields 2,4-dimethyl- 2 - ethoxymethyl-1,5-pentanediol dibenzoate, a viscous liquid.

A plasticized composition is prepared by mixing about 100 parts of poly(vinyl chloride) with 50 parts of the 2,4-dimethyl-2-ethoxymethyl-1,5-pentanediol dibenzoate produced above, and 2 parts of a trade stabilizer, milling the mixture together on a roll mill at a temperature between 130° C. and 150° C. and then molding at 160° C. for two minutes. The resulting plasticized sheet possessed good tensile strength, flexibility over a wide range of conditions, very low volatility and excellent color and heat stability.

*Exampe III*

About 118 parts of 2,4-dimethyl-2-ethoxyethoxymethyl-1,5-pentanediol is mixed with 125 parts of benzene, 177 parts of caproic acid, and 2 parts of p-toluenesulfonic acid and the mixture heated under reflux for several hours while the theoretical amount of water is collected. Distillation of the mixture under reduced pressure yields 2,4-dimethyl - 2 - ethoxymethyl-1,5-pentanediol dicaproate, a colorless viscous liquid.

A plastisol composition is prepared by combining 100 parts of finely-divided poly(vinyl chloride) with 60 parts of the 2,4-dimethyl-2-ethoxyethoxymethyl-1,5-pentanediol dicaproate, 10 parts of di(2-ethylhexyl) phthalate, and 3 parts of a polyvinyl chloride stabilizer and the resulting mixture mixed together to form a spreadable fluid paste. The paste is then spread on metal panels at a thickness of 8 mils (0.008″) with a doctor blade and the films baked at 177° C. for 5 minutes. At the completion of the baking period, the films are clear homogeneous compositions which have excellent flexibility.

*Example IV*

About 88 parts of 2,4-dimethyl-2-methoxymethyl-1,5-pentanediol is mixed with 90 parts of phthalic anhydride and the mixture slowly heated at a temperature from about 150° C. to 225° C. and then held at 225° C. until the reaction is substantially complete. A stream of carbon dioxide is sent through the charge to remove the air and carry away the water of esterification. At the completion of the reaction, vacuum is applied to remove the unreacted reactants. The resulting product is a viscous liquid polyester.

A plasticized composition is prepared by mixing 50 parts of the polyester produced above with 100 parts of poly(vinyl chloride) and 2 parts of a trade stabilizer, milling the mixture together at a temperature between 130° C. and 150° C. and molding the resulting sheet at 160° C. for two minutes. The resulting sheet possesses good tensile strength and excellent flexibility even at temperatures below about 0° C. In addition, the sheet has an approximately 0 volatility rating and has a very low water extraction value.

*Example V*

About 188 parts of 2,4-dimethyl-2-ethoxymethyl-1,5-pentanediol is mixed with 150 parts of acrylic acid, 2 parts of p-toluenesulfonic acid and 4 parts of hydroquinone and the resulting mixture heated as shown in Example I. Distillation of the reaction mixture under reduced pressure yields 2,4-dimethyl-2-ethoxymethyl-1,5-pentanediol diacrylate, a mobile colorless liquid.

An organosol composition is prepared by mixing 100 parts of finely-divided poly(vinyl chloride) with 40 parts of diacrylate produced above, 20 parts of dioctyl phthalate, 3 parts of a poly-vinyl chloride resin stabilizer, 3 parts of ditertiary butyl diperphthalate and 20 parts of a solvent comprising toluene and high boiling naphthalenes and mixing the ingredients together to form a spreadable mixture. This mixture is spread on metal panels and baked at 177° C. The resulting films are homogeneous compositions and are very hard and tough but quite flexible.

Films having related properties may be obtained by replacing the diacrylate ester in the above-described process with equivalent amounts of each of the following esters prepared as shown in the first paragraph: 2,4-dimethyl-2-butoxymethyl-1,5-pentanediol dimethacrylate, 2,4-dibutyl-2-allyloxymethyl-1,5-pentanediol di-2-butenoate, and 2,4-dihexyl-2-butoxymethyl-1,5-pentanediol di-2,4-hexadienoate.

*Example VI*

About 188 parts (1 mole) of 2,4-dimethyl-2-ethoxymethyl-1,5-pentanediol is combined with 312 parts (2 moles) of allyl hydrogen maleate, 300 parts of toluene, and 3 parts of p-toluenesulfonic acid and the mixture heated under reflux as shown in the preceding example. The resulting product is a colorless liquid identified as 2,4 - dimethyl - 2 - ethoxymethyl-1,5-pentanediol bis(allyl maleate).

About 30 parts of the ester produced above is combined with 20 parts of di(2-ethylhexyl) phthalate, 3 parts of a polyvinyl chloride resin stabilizer, 1 part of di-tert-butyl diperphthalate and 100 parts of poly(vinyl chloride) and the resulting mixture milled on a roll mill at a temperature between 130° C. and 150° C. and then molded at 175° C. The resulting sheets are homogeneous and quite hard and tough but still highly flexible.

A plastisol composition is prepared by combining 100 parts of finely-divided poly(vinyl chloride) with 60 parts of 2,4-dimethyl-2-ethoxymethyl - 1,5 - pentanediol bis(allyl maleate), 20 parts of dioctyl phthalate, 3 parts of polyvinyl chloride stabilizer and 2 parts of tertiary butyl perbenzoate, and the resulting mixture mixed together to form a spreadable paste. The paste is then spread on metal panels at a thickness of 8 mils with a doctor blade and the films baked at 177° C. for 5 minutes. At the completion of the baking period, the films are homogeneous compositions which are very tough and hard with a leathery feeling but still quite flexible.

Films having related properties may be obtained by replacing 2,4-dimethyl-2-ethoxymethyl-1,5-pentanediol bis(allyl maleate) in the above process with equivalent amounts of each of the following esters prepared by a process similar to that shown in the first paragraph: 2,4 - dimethyl - 2 - methoxymethyl - 1,5 - pentanediol bis(vinyl maleate), 2,4-dimethyl-2-butoxymethyl-1,5-pentanediol bis(methallyl fumarate), 2,4-dimethyl-2-hexoxymethyl-1,5-pentanediol bis(allyl glutaconate) and 2,4-dimethyl-2 - ethoxymethyl - 1,5 - pentanediol bis(furfuryl maleate).

I claim as my invention:

1. An ester of (1) 1,5-pentanediol wherein a chain carbon atom immediately adjacent to one of the terminal hydroxyl-bearing carbon atoms is joined to an alkyl group containing from 1 to 8 carbon atoms, and the chain carbon atom adjacent to the other terminal hydroxyl-bearing carbon atom is joined to an alkyl group containing from 1 to 8 carbon atoms and to a $CH_2OR$ group wherein R is a hydrocarbon radical containing from 1 to 10 carbon atoms, and (2) an acid component of the group consisting of moncarboxylic hydrocarbon acids containing from 1 to 10 carbon atoms, polycarboxylic hydrocarbon acids containing from 2 to 10 carbon atoms, and acid esters of polycarboxylic hydrocarbon acids containing from 2 to 10 carbon atoms with aliphatic hydrocarbon monohydric alcohols containing from 1 to 8 carbon atoms.

2. An ester of (1) 1,5-pentanediol wherein a chain carbon atom immediately adjacent to one of the terminal hydroxyl-bearing carbon atoms is joined to an alkyl side chain containing from 1 to 8 carbon atoms, and the chain carbon atom adjacent to the other hydroxyl-bearing carbon atom is joined to an alkyl radical containing from 1 to 8 carbon atoms and to a ROCH$_2$— radical wherein R is an aliphatic hydrocarbon radical containing from 1 to 10 carbon atoms, and (2) a monocarboxylic hydrocarbon acid containing from 1 to 10 carbon atoms.

3. A diester of 2,4-dialkyl-2-alkoxymethyl-1,5-pentanediol wherein each alkyl group attached to the number 2 and 4 carbon atoms contains from 1 to 8 carbon atoms and the alkoxy portion of the alkoxymethyl radical contains from 1 to 10 carbon atoms and an aliphatic monocarboxylic hydrocarbon acid containing from 6 to 10 carbon atoms.

4. 2,4 - dimethyl - 2 - methoxymethyl - 1,5 - pentanediol dicaprate.

5. 2,4 - dimethyl - 2 - ethoxymethyl - 1,5 - pentanediol dibenzoate.

6. 2,4 - dimethyl - 2 - ethoxymethyl - 1,5 - pentanediol bis(allyl maleate).

7. 2,4 - dimethyl - 2 - ethoxymethyl - 1,5 - pentanediol diacrylate.

8. An ester of 2,4-dimethyl-2-methoxymethyl-1,5-pentanediol and a monocarboxylic hydrocarbon acid containing from 1 to 10 carbon atoms.

9. An ester of 2,4-dimethyl-2-methoxymethyl-1,5-pentanediol and an acid ester of a polycarboxylic hydrocarbon acid containing from 2 to 10 carbon atoms with an aliphatic hydrocarbon monohydric alcohol containing from 1 to 8 carbon atoms.

10. An ester of 2,4-dimethyl-2-methoxymethyl-1,5-pentanediol and a dicarboxylic hydrocarbon acid containing from 2 to 10 carbon atoms.

11. An ester of 2,4-dimethyl-2-methoxymethyl-1,5-pentanediol and an acid ester of an aliphatic unsaturated dicarboxylic hydrocarbon acid containing from 4 to 10 carbon atoms with an ethylenically unsaturated hydrocarbon monohydric alcohol containing from 3 to 8 carbon atoms.

12. An ester of 2,4-dialkyl-2-alkoxymethyl-1,5-pentanediol wherein each alkyl group attached to the number 2 and 4 carbon atoms contains from 1 to 8 carbon atoms and the alkoxy portion of the alkoxymethyl radical contains from 1 to 10 carbon atoms, and a polycarboxylic hydrocarbon acid containing from 2 to 10 carbon atoms.

13. An ester of 2,4-dimethyl-2-methoxymethyl-1,5-pentanediol and phthalic anhydride.

References Cited in the file of this patent

UNITED STATES PATENTS

| Number | Name | Date |
|---|---|---|
| 2,273,891 | Pollack et al. | Feb. 24, 1942 |
| 2,379,251 | Muskat et al. | June 26, 1945 |
| 2,500,033 | Hetzel | Mar. 7, 1950 |
| 2,504,929 | Hetzel | Apr. 18, 1950 |
| 2,545,811 | Hetzel | Mar. 20, 1951 |
| 2,563,206 | Bergmann | Aug. 7, 1951 |